United States Patent
Ueno (10) Patent No.: US 6,513,096 B2
(45) Date of Patent: Jan. 28, 2003

(54) MULTI TASK INFORMATION RECORDATION SYSTEM AND INFORMATION STORAGE MEDIUM

(75) Inventor: Tomomi Ueno, Chigasaki (JP)

(73) Assignee: Ricoh Company, Ltd. (JP)

( * ) Notice: Subject to any disclaimer, the term of this patent is extended or adjusted under 35 U.S.C. 154(b) by 42 days.

(21) Appl. No.: 09/865,676

(22) Filed: May 29, 2001

(65) Prior Publication Data
US 2002/0046332 A1 Apr. 18, 2002

(30) Foreign Application Priority Data
May 30, 2000 (JP) .................................... 2000-159429

(51) Int. Cl.⁷ ............................................ G06F 12/00
(52) U.S. Cl. ..................... 711/111; 711/112; 710/52; 709/100
(58) Field of Search ................. 711/101, 103, 711/111–112; 369/30.03, 47.54, 53.41, 53.44; 710/10–69; 709/100–105; 714/6

Primary Examiner—Do Hyun Yoo
Assistant Examiner—Nasser Moazzami
(74) Attorney, Agent, or Firm—Dickstein Shapiro Morin & Oshinsky LLP

(57) ABSTRACT

An information recordation system includes a plurality of information recordation devices that records information onto information recordable mediums using at least one recording software. A host computer is provided to transmit write information from at least one storage device to the plurality of information recordation devices. A write information candidate display device is provided to selectively display at least one write information candidate stored in the at least one storage device on a display. A write information selection device is provided to select at least one write information among the at least one write information candidate. An information recordation device candidate display device is provided to display a plurality of information recordation device candidates, which are available to cooperate with the host computer using the at least one recording software, on the display. An information recordation device selection device is provided to select at least two information recordation devices among the plurality of information recordation device candidates. A recordation start instruction device is provided to instruct the host computer to transmit selected one or more write information to the selected at least two information recordation devices, and instruct the selected at least two information recordation devices to work in parallel while avoiding "buffer under run".

11 Claims, 8 Drawing Sheets

MULTI TASK INFORMATION RECORDATION SYSTEM AND INFORMATION STORAGE MEDIUM

CROSS-REFERENCE TO RELATED APPLICATIONS

This application claims priority under 35 U.S.C. §119 to Japanese Patent Application No. 2000-159429 filed on May 30, 2000, the entire contents of which are incorporated by reference.

BACKGROUND OF THE INVENTION

1. Field of the Invention

The present invention generally relates to an information recordation system that employs an information recordation apparatus such as an optical disc drive that records information onto an information recordable medium such as a CD-R/RW (Recordable and Rewritable Compact Disc), a DVD-R/RW (Recordable and Rewritable Digital Versatile Disc), etc., and an information recordation medium that stores program that enables a host computer to practice a software.

In particular, the present invention relates to a multitasking information recordation system capable of recording a plurality of information onto a plurality of information recordable mediums in parallel using a plurality of information recordation apparatuses, and an information recordation medium that stores a program capable of multitasking.

2. Discussion of the Background

To reliably read recorded contents with a CD-R/RW drive, a DVD-R/RW drive, etc., that can write information such as data, music, etc., a prescribed writing method should be utilized in accordance with a standard such as the Orange Book. According to the Orange Book or the like, a joint portion (i.e., continuity between portions in which data recordation is terminated when temporary stoppage or the like occurs during data recordation and the next recordation starts) is also standardized so as to prevent lack of reading of recorded contents or waste of a used optical disc, especially, of an additional recordation type that might occur due to a lack or disturbance of data continuity at the joint portion.

One typical solution to the above described joint portion problem is to avoid temporarily stops while recording.

Focussing on this point, manufacturers of drive devices or programs have continuously performed development.

Typically, when write data is transmitted from a host computer (e.g. a personal computer) at a transfer rate (i.e., a transfer speed) in excess of a write speed of an optical disc drive, a writing operation is interrupted and results in failure, because next data can not subsequently be written. Such a phenomenon is called as "buffer underrun", and a variety of devices that attempts to suppress the phenomenon have been proposed.

For example, Japanese Patent Application Laid Open No. 10-49990 proposes a write device that writes (data) while maintaining data continuity using CIRC (Cross Interleave Reed Solomon Code) demodulation at both of data write termination and start portions on an optical disc. As a result, such a technology can maintain data continuity even when there is a temporary stoppage and/or a change in a write speed occurs during data recordation.

The number of personal computer users who use the above described types of optical disc drives has increased as the drives and writable optical discs become more affordable. Limitations are typically imposed on personal computers in order to ensure that recordings are not interrupted. For example, multitasking is often disabled during recording, thereby preventing use of another application until the recording is completed.

However, as described in Japanese Patent Application Laid Open No. 10-49990, for example, a solution for the above-described joint portion problem has been developed in the drive device side. Thus, multitasking can be enabled even while recording.

Unfortunately, even when using a drive which incorporates the above described improvements, limitations in the recording software, OS (operating system) drivers, and the application environment may limit multitasking. Thus, real multitasking, in which a plurality of recording software starts and a plurality of separate write operations is substantially simultaneously performed by a plurality of drive units, can not currently be achieved.

Additionally, the performance of many operation environments (e.g., a personal computer, its operating system, the recording software, etc) is significantly degraded when multitasking occurs during recording. As a result, many users do not multitask during recording.

However, a performance of a personal computer has recently been improved. Accordingly, the operating system and the recording software can be designed to support multitasking under some situations.

SUMMARY OF THE INVENTION

Accordingly, an object of the present invention is to address and resolve the above and other problems and provide a new information recordation system. The above and other objects are achieved according to the present invention by an information recordation system including a plurality of information recordation devices configured to record information onto information recordable mediums using at least one recording software. A host computer may also be provided in the information recordation system to transmit write information from at least one storage device to the plurality of information recordation devices. A write information candidate display device may also be provided to selectively display at least one write information candidate stored in the at least one storage device on a display. A write information selection device may also be provided to select at least one write information among the at least one write information candidate. An information recordation device candidate displaying device may also be provided to display a plurality of information recordation device candidates, which is available to cooperate with the host computer using the at least one recording software, on the display. An information recordation device selection device may also be provided to select at least two information recordation devices among the plurality of information recordation device candidates. A recordation start instruction device may be provided to instruct the host computer to transmit one or more write information selected by the write information selection device to the at least two information recordation devices selected by the information recordation device selection devices, and may instruct the at least two information recordation devices to work in parallel.

In another embodiment, the plurality of information recordation devices may include information recordable optical disc drives configured to record information onto optical discs using write devices configured to write information while maintaining data continuity between information write start and termination portions when recordation is stopped and restarted.

In yet another embodiment, a recording software selection device may be provided to select a plurality of recording software in accordance with a type of write information to be recorded so that at least one write information and at least one information recordation device can be selected in different combination per recording software selection.

In yet another embodiment, a parallel operation instruction device may be provided to instruct the information recordation system to perform another job in parallel with the recordation performed by at least one information recordation device.

In yet another embodiment, another job may include sound reproduction for reproducing sound of write information originally stored in the at least one storage device via a speaker.

In yet another embodiment, another job may include data display for displaying contents of data originally stored in the at least one storage device on the display.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Referring now to the drawings, wherein like reference numerals designate identical or corresponding parts throughout several views.

The first embodiment of the present invention is now described with reference to FIGS. 1 through 4. As briefly illustrated in FIG. 1, an information recordation system of this embodiment may be applied to a computer system. The computer system is constructed by a general-purpose computer (e.g. a personal computer) that functions as a host computer 1, and a plurality (e.g. three) of optical disc drives 2, 3 and 4 that is externally connected to the host computer 1 as an information recordation device and writes information in an additionally recordable and rewritable disc (CD-R/RW).

Figure 1:
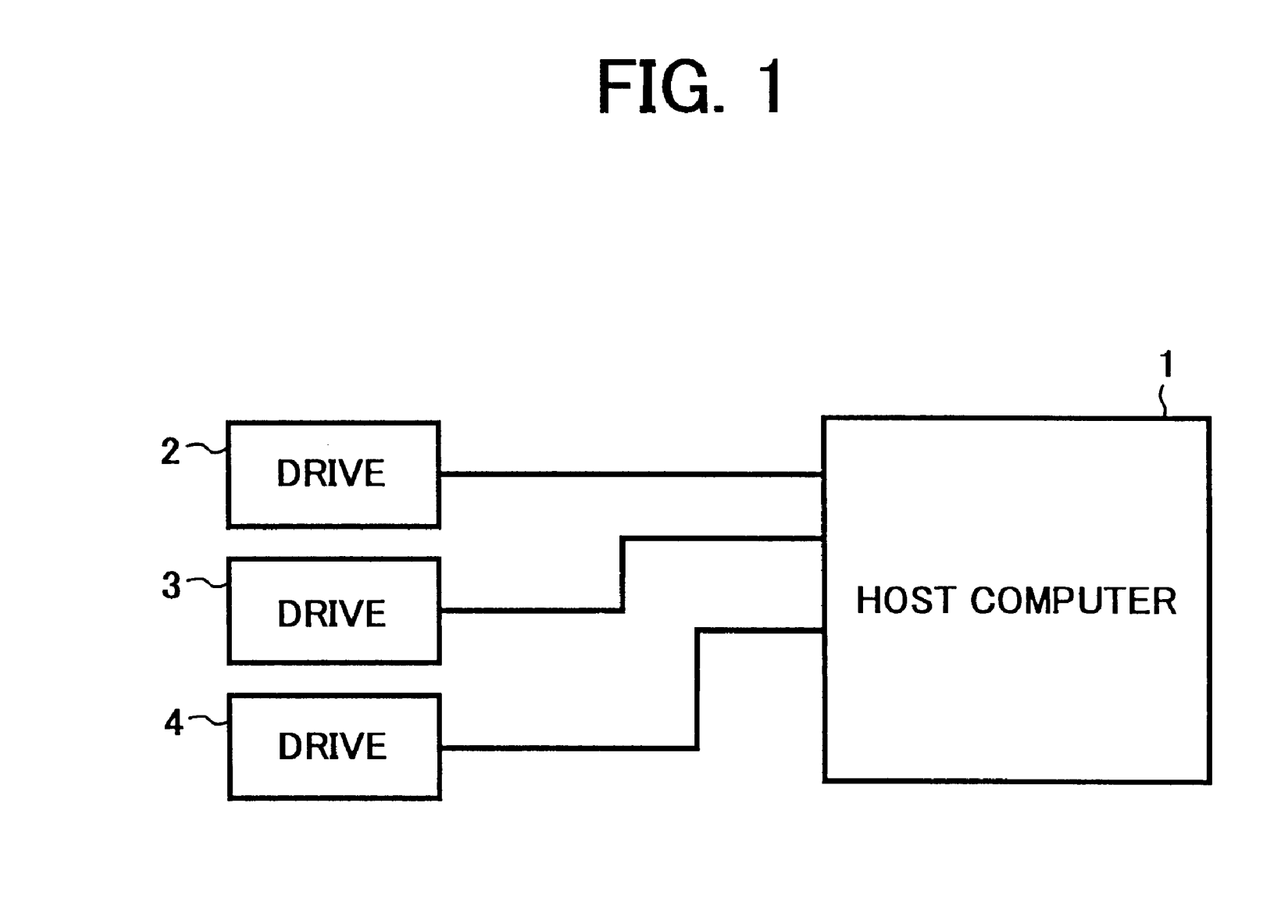
FIG. 1 is a schematic block diagram for illustrating one embodiment of a construction of a computer system according to the present invention.

Document and image data formed in a file format and music information or similar information may be utilized as recordation write information.

Figure 2:
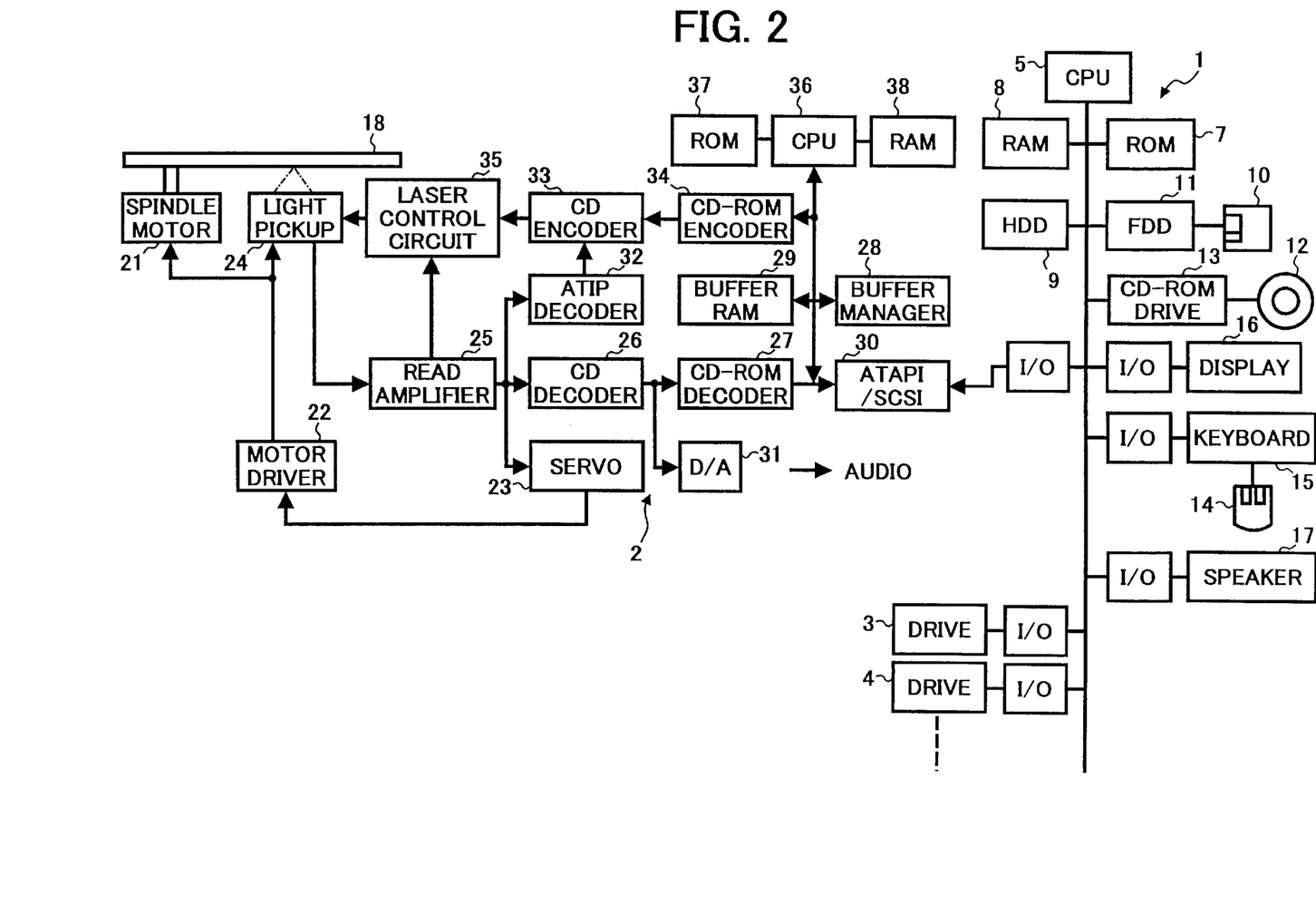
FIG. 2 is a block diagram for illustrating an exemplary construction of hardware employed in the computer system illustrated in FIG. 1.

FIG. 2 illustrates an exemplary hardware of the host computer 1 and the optical disc drive 2. The host computer 1 may employ a specified construction as appropriate. For example, the host computer 1 may include a CPU (Central Processing Unit) 5. A ROM (Read Only Memory) 7, a RAM (Random Access Memory) 8, an HDD (hard disc drive) 9, and an FDD (floppy disk drive) 11 that accommodates an FD (floppy disc) 10 may be connected to the CPU 5 via a bus line 6. Also connected to the CPU 5 via the bus line 6 may be a CD-ROM drive 13 that accommodates a CD (Compact Disc)-ROM 12, a keyboard connected with a mouse 14, a display 16, and a speaker or similar devices. The above-described optical disc drives 2, 3 and 4 may also be connected thereto.

The host computer 1 may include a plurality of drive devices 11 and 13, a mouse 14, and a keyboard 15 or the like as data input devices that receive a variety of data as external inputs. As data output devices that externally outputs a variety of data, an FDD 11, a display 16, a speaker or the like may be employed beside an optical disc 18. In addition, a RAM 8, an HDD 9, and an FD 10 or the like may be provided as data storage devices that temporarily store a variety of data. As an information storage medium that can supply the CPU 5 with prerecorded program (i.e., software), a ROM 7, a ROM 8, a HDD 9, a FD 10, a CD-ROM 12, etc., may be included. In addition, an MO, an MD, a CD-R/RW, a DVD-R/RW, a memory card, etc., (not shown) can also be provided.

In the host computer 1, a control program (e.g. a later described recording software of optical disc write use) that enables the CPU 5 to perform a variety of operations my be present as software and stored in the CD-ROM 12. Such software may be preinstalled in the HDD 9, and is copied to the RAM 8 when the host computer 1 starts. The CPU 8 may then read the copy when an operation is executed.

Thus, the later described variety of devices may perform a variety of functions when the CPU 5 reads a variety of programs and executes applicable data processing operations.

An exemplary hardware for an optical disc drive 2 connected to the host computer 1 is now described with reference to FIG. 2. A spindle motor 21 may be provided to drive the optical disc 18 of the CD-R/RW disc. The spindle motor 21 may be controlled by a motor driver 22 and a servo device 23 so as to rotate at a constant linear velocity (CLV). A light pickup 24 may include a semiconductor laser as a light source (not shown), an optical unit, and a focusing actuator. Also built in the light pickup 24 may be a tracking actuator, a light receiving element, and a position sensor, etc. The light pickup 24 may irradiate a recordation surface of the optical disc 18 with a laser beam.

The light pickup 24 may be movable in a sledge direction (i.e., a disc radius direction) by a seek motor. These focusing actuator, tracking actuator, and seek motor may cooperatively control and position a laser spot at a target position on the optical disk 18 in cooperation with the motor driver 22 and the servo device 23 based on a signal obtained from a position sensor and the light receiving element.

When data is reproduced, a reproduction signal obtained by the light pickup 24 is amplified and digitized by a read amplifier 25, and then input to the CD decoder 26. A plurality of operations for de-interleave and error correction may then be performed. The error correction operation may be performed so as to increase data credibility by inputting data obtained after the de-interleave and error correction to a CD-ROM decoder 27.

Then, data processed by the CD-ROM decoder 27 may temporary be stored in a buffer RAM 29 by a buffer manager 28, and transmitted at once to the host computer 1 side by the interface 30 when organized as sector data. In addition, in a case of music data, data output from the CD decoder 26 may be input to the D/A converter 31 and an analogous audio signal may then be taken out.

In contrast, when data is to be recorded and write data transmitted from the host computer 1 is received by the interface 30, the data may temporary be stored in the buffer RAM 29 by the buffer manager 28. When a certain amount of data is stored in the buffer RAM 29, recordation is started.

Before the recordation start, a laser spot may be positioned at a write start position. The write start position may be determined by a wobble signal that has previously been engraved in the optical disc 18 with a snaky track. The wobble signal may include absolute time information (ATIP) that is taken out by the ATIP decoder 32.

In addition, the ATIP decoder 32 may generate and send a synchronization signal into the CD encoder 33.

The synchronization signal may enable data to be written at a precise position. Data in the buffer RAM 29 may receive an additional error correction code and interleave in the CD-ROM encoder 34 and the CD encoder 33. The data may then be recorded onto the optical disc 18 via the laser control circuit 35 and the light pickup 24.

The optical disc drive 2 may include a CPU 36, a ROM 37, and a RAM 38 that control the above-described operation performed in each of sections.

When data is to be recorded, write data transmitted from the host computer 1 via the ATAPI/SCSI interface 30 may temporary be stored in the buffer RAM 29 and then recorded.

The optical disc drive 2 of this embodiment may record and reproduce data onto and from a recordable optical disc 18.

A function as a write device that performs a write operation may be added so as to maintain data continuity at both of information write termination and start portions on the optical disc 18. Specifically, as illustrated in Japanese Patent Application Laid Open No. 10-49990, when a temporary stoppage signal is input, clock input to the CD-ROM encoder 34 and a CIRC encoder (not shown) and encode operations of those may be interrupted, and write data may stop being output. In addition, a current write operation performed in the optical disc 18 may simultaneously be interrupted (i.e., temporary stopped) by masking a write gate. Data in progress of receiving an encode operation may be stored as it is in RAMs (not shown) provided in the CD-ROM encoder 34 and the CIRC encoders, and subsequently output as write data when the temporary stoppage signal is reset (or a restart signal is set).

Then, the write mask is cleared and a write operation for the optical disc 18 may be restarted. Since both of the temporary stoppage and restart timings are highly synchronized with a temporary stoppage signal, data write continuity between the data write termination and start points in the optical disc 18 can be maintained. Further, a writing method proposed in Japanese Patent Application Laid Open No. 2000-40302 that maintains recordation data continuity may be employable.

The optical disc drives 3 and 4 may have substantially the similar hardware to that in the optical disc drive 2.

In such a system, recording software supporting multi-tasking may be set as a control program in the host computer 14. Thus, functions of an information write candidate display device, a write information selection device, a recordation device candidate display device, a recordation device selection device, and a recordation operation execution designation device can be performed when a write operation is performed using the optical disc drives 2, 3, and 4.

Figure 3:
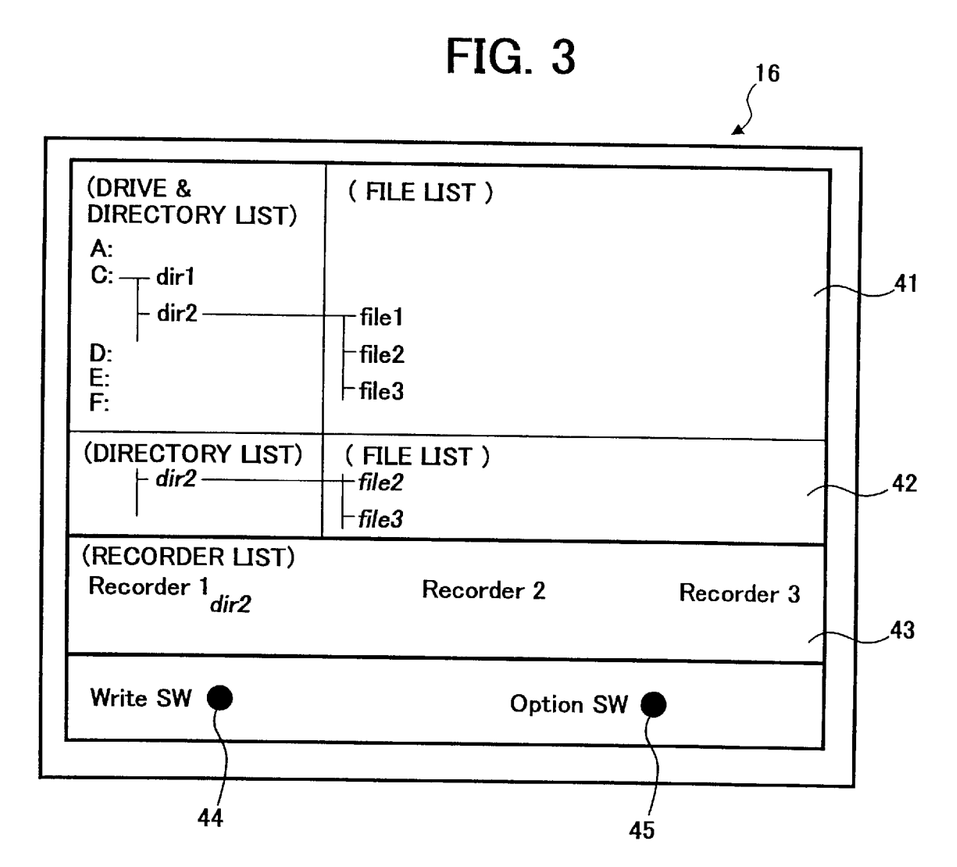
FIG. 3 is a front side view of an exemplary screen display on a display apparatus.

FIG. 3 illustrates one example of an execution screen provided in a display 16 and performs as a user interface with a recording software that is built in the host computer 1.

An original data display screen 41 may be provided in the execution screen and display a list of storage devices such as an HDD 9, an FDD 11, a CD-ROM drives, etc., connected to the host computer 1 while describing A-drive, B-drive, etc.

In addition, information such as names of a directory, a sub directory (e.g. dir 1, dir 2, etc.) existing at a layer below the directory, and a file may be read and displayed thereon from a storage device (e.g. C-drive) that is selected from the drive device list. A selection data display screen 42 may also be provided so as to optionally select and designate, by executing drag and drop, a desired directory or file to be written by the drive devices 2, 3 and 4 from the original data display screen 41. The drawing may represent a case in which a pair of files 2 and 3 of the directory 2 is selected and designated among the original data display screen 41 as write information. A construction of the directory and file dropped in this selection data display screen 42 may optionally be changeable as appropriate. A recorder list display screen 43 may also be provided so as to display a list of drive devices that are connected to the host computer 1 and controllable by the recording software according to this embodiment of the present invention. As noted from the drawing, the optical disc drives 2, 3 and 4 may correspond to recorders 1, 2 and 3, respectively. In addition, a write switch 44 may be provided in the execution screen to be used to instruct execution of write through a mouse or similar devices. An option switch 45 may also be provided in the execution screen.

Figure 4:
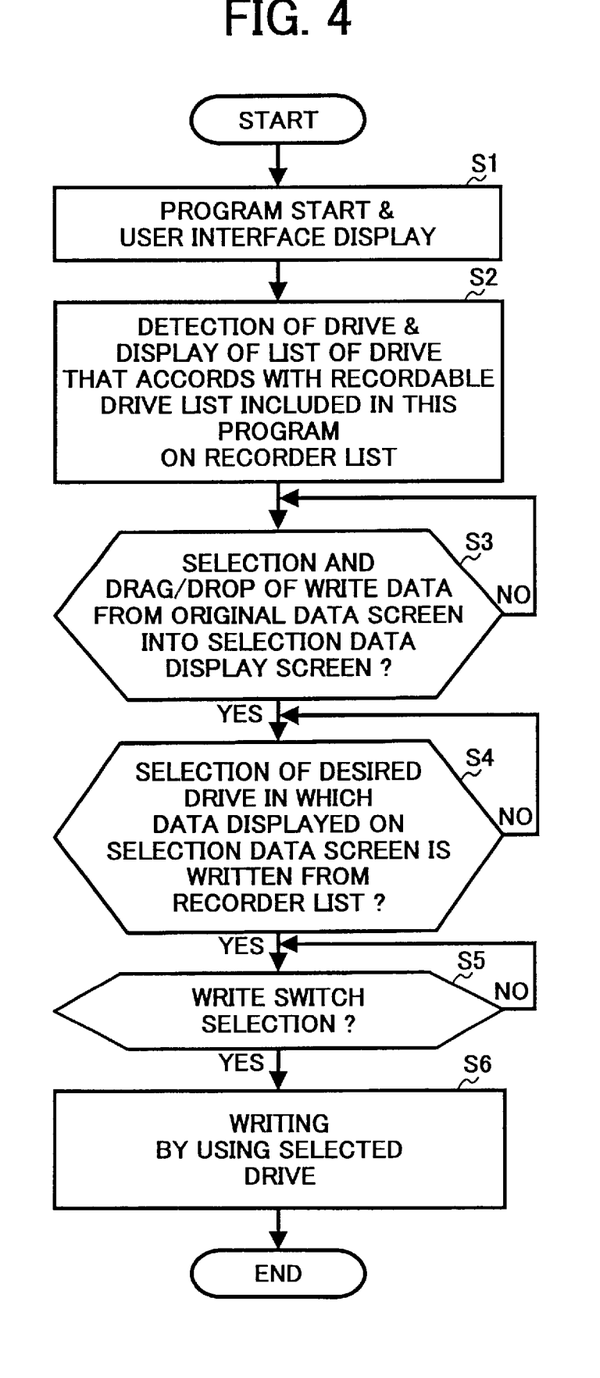
FIG. 4 is a schematic flowchart for illustrating an exemplary control operation performed when a write operation is performed.

The control operation performed by the CPU 5 of the host computer 1 is now described with reference to FIG. 4. When a program of an applicable write software is started, a screen of the user interface illustrated in FIG. 3 may be displayed on the display 16 (in step S1). Both of the selection data display screen 42 and recorder list display screen 43 may be blank.

The original data display screen 41 may display a file list that is selected by a user through both of drive and directory designation operations. Such a display operation may perform a function of the write information candidate display device.

Subsequently, one or more drive devices that connect to the host computer 1 may be detected. A list including one or more units of drive devices that conforms with drive device information stored in the program of the host computer 1 may be displayed on the recorder list display screen 43 as an available drive device (in step S2). As noted from FIG. 3, the optical disk drives 2, 3, and 4 may be listed up as recorders 1, 2, and 3. Such a display operation in step S2 may function as a recordation candidate display device.

Then, a name of a desirable directory or file to be written in an optical disk 18 may be selected by performing drag and drop from the directory and file lists displayed on the original data display screen 41 as write information (Yes, in step S3). This operation may fuinction as a write information selection device. Thus, the file name may be ready to be designated. FIG. 3 may illustrate a case when two file names such as Files 2 and 3 are designated among the candidate files 1, 2 and 3.

When necessary write information is selected, a write operation may be started. A recorder (i.e., a drive device) may optionally be selectable from the recorder fist display screen 43 as a write destination in this embodiment. Specifically, one or more units (including all units) can optionally be selected as far as a drive device can be listed up on the recorder list display screen 43. A prescribed desirable drive device may be selected from the recorder list (Yes, in step S4) so as to write information in an optical disk 18. This operation in step S4 may function as a recordation device selection device. Thus, a prescribed drive device may be ready to be designated so as to perform the writing operation.

Such a drive device selection and designation operation can be performed before selection and designation of the directory and file name. Namely, an order of such selection and designation may be changeable and substantially the same effect may be obtained.

After the selection and designation of both of the file and drive device names and the operation of the light switch 44 (Yes, in step S5), a writing operation may practically be started by transferring write information of the file name selected from the original data existing directory (in step S6) to one or more of the optical disc drives 2, 3 and 4.

These operations in steps S5 and S6 may function as a recordation execution designation device.

In addition, each of the optical disc drives 2, 3, and 4 has a function of writing while maintaining data continuity at information write termination and start portions on the optical disk 18. Thus, even when temporary stoppage of a task occurs in a prescribed drive device at an optional timing during the multi task due to, for example, full of the buffer memory, a time sharing control performed when using one CPU, etc., the writing operation may not substantially be interrupted.

In addition, the host computer 1 may not be required to control writing of any one of optical disc drives 2, 3, and 4 as a single task. Specifically, the host computer 1 can control the writing of any one of those with a multi task specification.

In other words, the host computer 1 enables a plurality of units of optical disc drives 2, 3, and 4 to write selected and designated information in a plurality of optical discs 18 in parallel.

The above-described write operation can also sequentially be performed by the plurality of units of optical disc drives in a manner such that the next write operation is started by a different optical disc drive when the former write operation has been completed.

Figure 5:
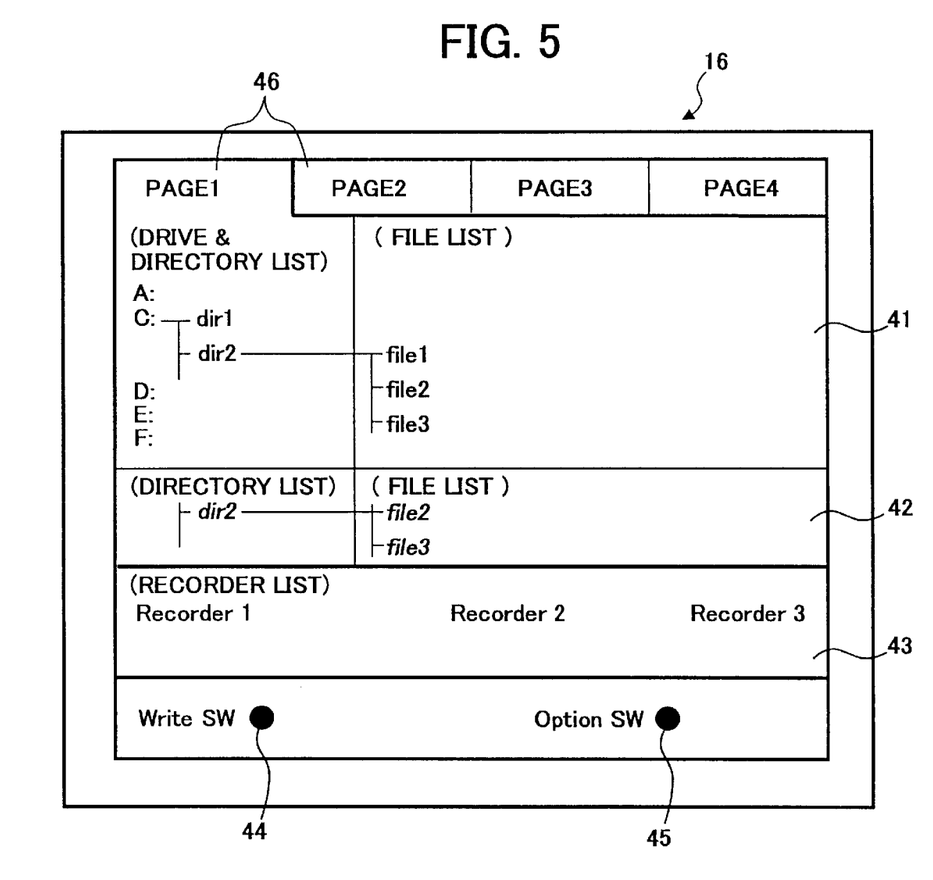
FIG. 5 is a front side view of another exemplary screen display on a display apparatus.
Figure 6:
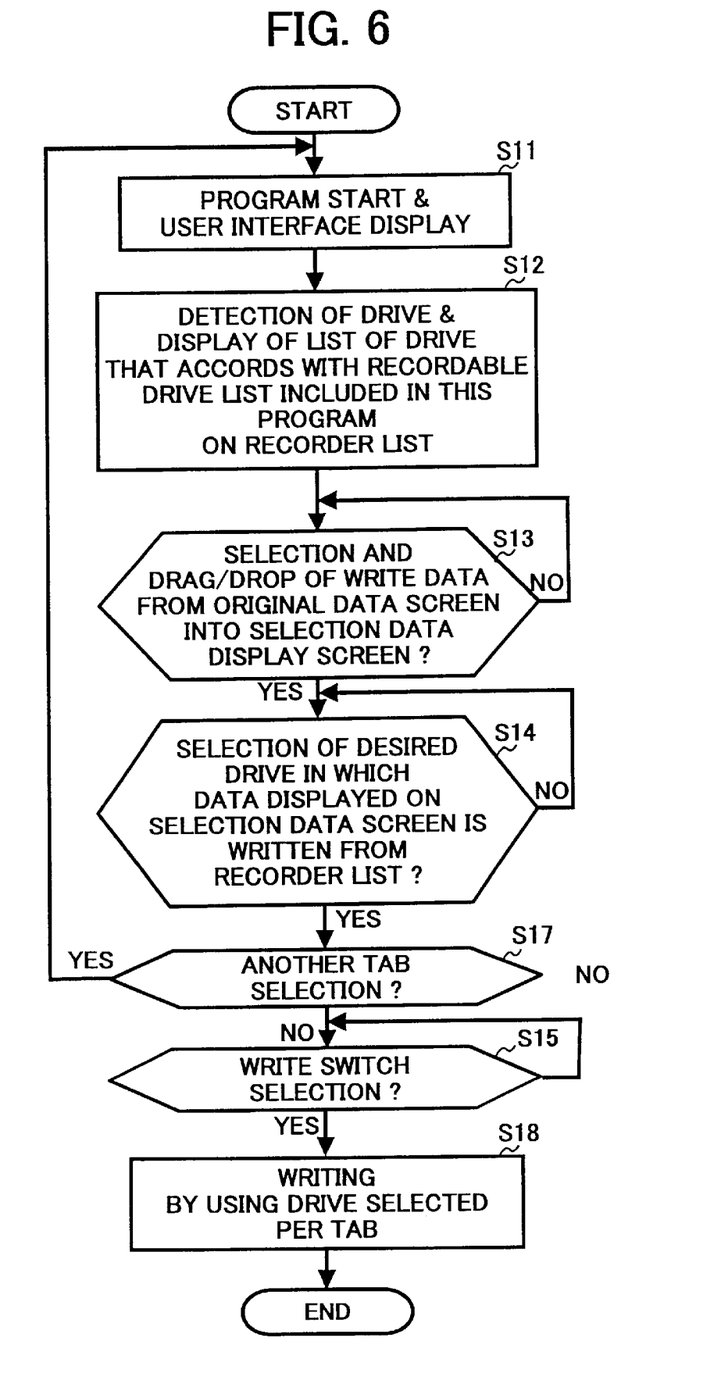
FIG. 6 is a schematic flowchart for illustrating another exemplary control operation performed when a write operation is performed.

The second embodiment is now described with reference to FIGS. 5 and 6.

The second embodiment achieves selection and designation of both of one or more write information file and disc drive per program of a recording software. To this end, a plurality of combinations of the above-described write information candidate display device, write information selection device, recording device candidate display device, and recording device selection device can optionally be selected using a selection switching device. Specifically, a plurality of pages having index tabs (e.g. PAGE 1, PAGE 2, PAGE 3) may be provided in the execution screen of the display 16. In addition, selection and designation may independently be performed per program of a recording software included in each of desired pages (or combination of desired pages) selected by a tab.

An exemplary control operation of this embodiment is now described with reference to FIG. 6. A series of operations (i.e., from program start in step S11 to selection of a write desired drive device in step S14) may similarly be performed to those described with reference to FIG. 4. After an operation in step S14 is terminated, another tab, for example the second tab (PAGE 2), may be selected depending on a need.

When the another tab has been selected (Yes, in step S17), another program of a recording software that corresponds to the another tab is started, and operations may similarly be performed to those performed in from steps S11 to S14. A new selection data display screen 42 may appear on the execution screen of the display 16 and not include information as displayed in the case of the first tab beside a blank. Similar to the case of the first tab, a desired file name or the like displayed on the original data display screen 41 can optionally be selected and designated. Such selection contents can be either substantially the same as or entirely different from the file name selected in the case of the first tab. A prescribed number of units of drive devices may optionally individually be selected and designated as one or more write destinations per tab. Accordingly, every time another tab is selected in step S17, operations performed in steps S1 to S4 may similarly be repeated, while selecting and designating one or more file names (i.e., write information) and drive devices per repeat. Hence, an operation performed in step S7 may function as a selection switching device.

When such another selection and designation are not required any more, in other words, selection and designation of both of the file and drive device are completed, and the write switch 44 is depressed (Yes, in step S5), one or more files of one or more directories selected through the tab operation may be transmitted to the one or more applicable optical disc drives 2, 3, and/or 4 as write information in accordance with the selection performed per tab. After that, a writing operation may be performed (in step S8). Hence, those operations performed in steps S5 and S8 may function as a recordation execution designation device.

In the first embodiment, a single kind of write source data (i. e., directory and file names) is written. However, according to the second embodiment of the present invention, since a plurality of program of a recording software can be started by changing a tab, a different combination of the write information and write destination drive device can be selected and designated per the program. Thus, different write information can substantially simultaneously be written in a plurality of optical discs 18 by a plurality of optical disc drives 2, 3, and/or 4. In addition, a multiple level of a multi task may be increased, and accordingly, user friendliness may be improved.

In the above-described exemplary execution screen of the display 16, a plurality of pages is subsequently selected and displayed. However, all pages can be separately simultaneously displayed on the execution screen.

Figure 7:
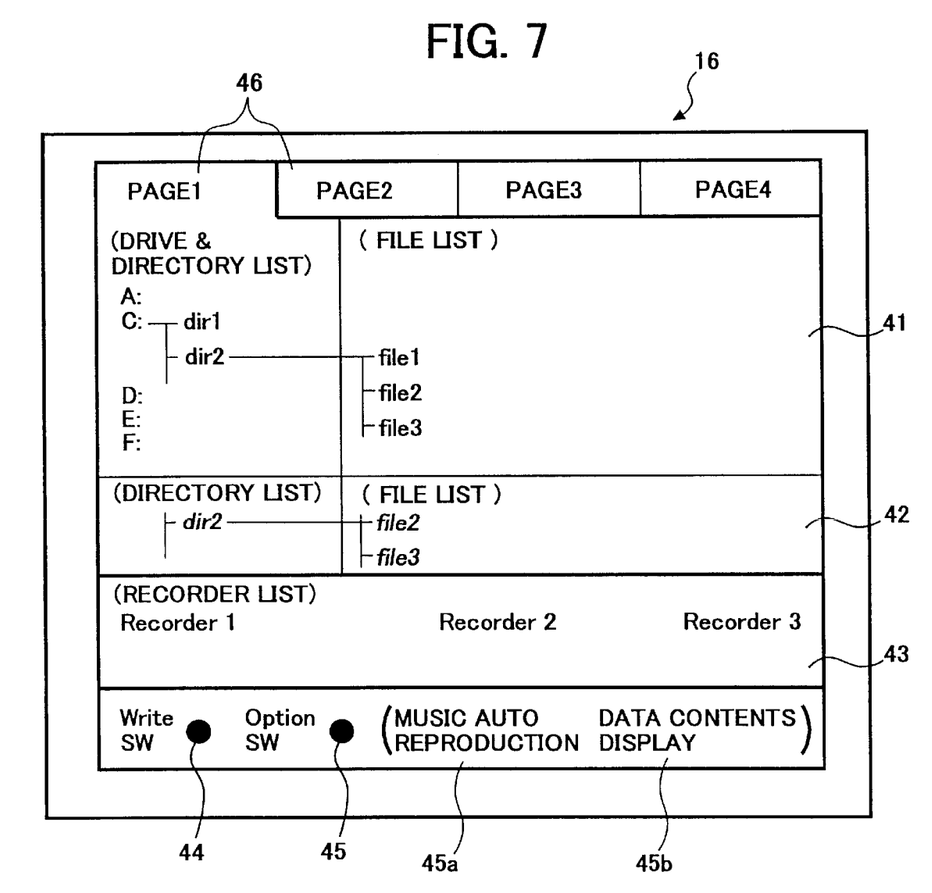
FIG. 7 is a front side view of another exemplary screen display on a display apparatus.
Figure 8:
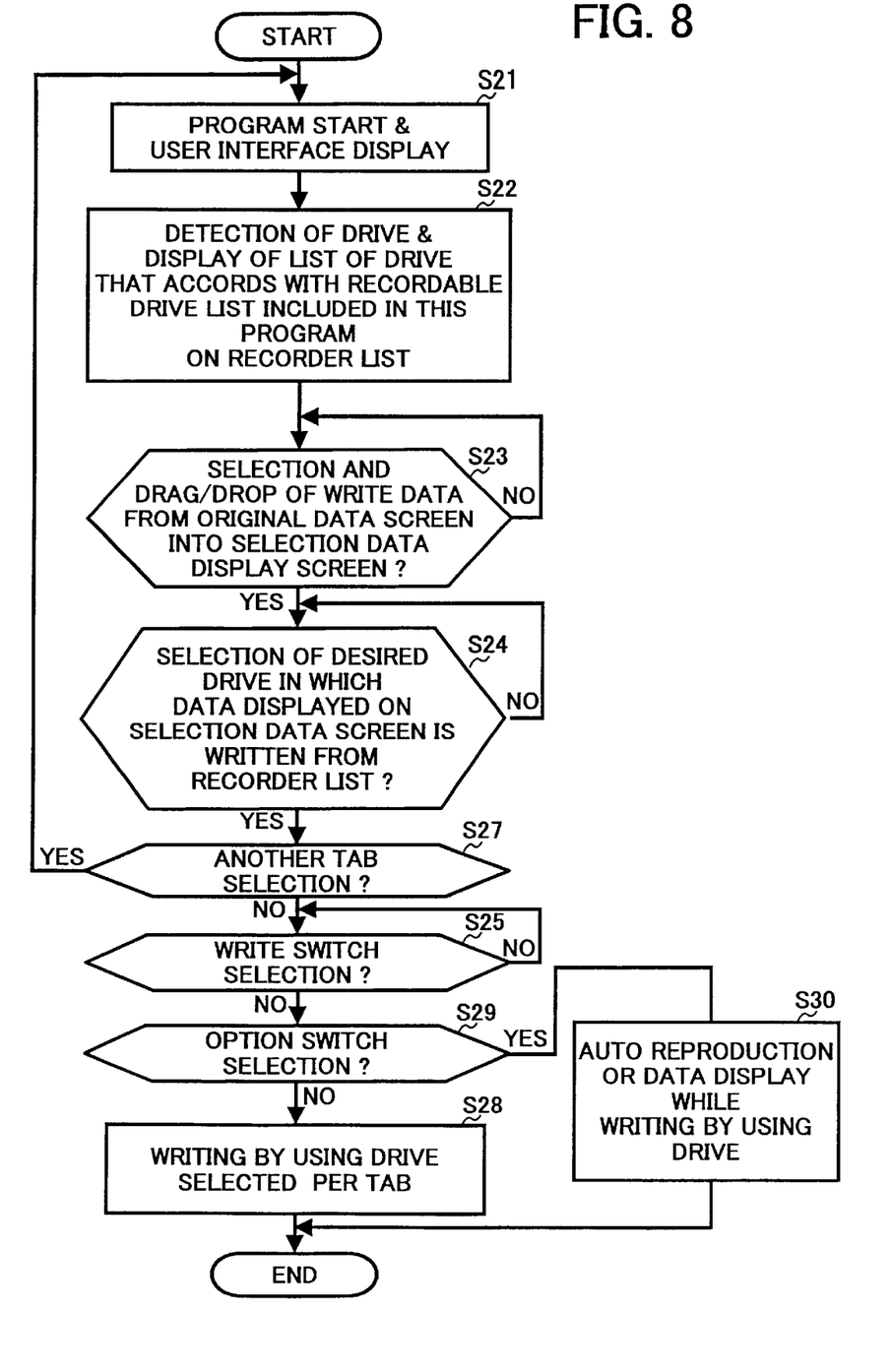
FIG. 8 is a schematic flowchart for illustrating another exemplary control operation performed together with a write operation.

The third embodiment is now described with reference to FIGS. 7 and 8. When a selected drive device writes selected information, a job such as a sound auto reproduction operation, a data contents display operation, etc., other than the currently performed write operation substantially simultaneously be performed selectively based on a user's selection operation. To this end, a plurality of indications of sound auto reproduction 45a or data contents display 45b may be provided and optionally selected and designated through an operation of the option switch 45 as illustrated in FIG. 7.

To start a control operation of the third embodiment, it is determined at an appropriate timing before a write operation if the optional switch 45 has previously been selected (in step S29). If the optional switch 45 is not selected (No, in step S29), the above-described write operation may be performed substantially in the similar manner as described in the first and second embodiments (in step S28). In contrast, if the option switch 45 is selected (Yes, in step S29), one or more drive devices selected per tab may perform a write operation together with auto sound reproduction and/or data display (in step S20). If the option switch 45 selects the sound auto reproduction 45a, certain sound (e.g. music, voice, etc.) may automatically reproduced. Where as if the option-switch 45 selects the data contents display 45b, data contents may be displayed on the display 16. Hence, these operations performed in steps S9 and S10 may function as a simultaneous operation designation device.

Specifically, when the optical disc drive 2, 3, and/or 4 writes sound data in one or more optical disc 18, the host computer 1 may reproduce the original data preserved, for example, in an HDD 9 and generate sound through the speaker 17. As a result, a user can confirm contents of a tune that is written in the optical disc 18 with audition. When the optical disc drive 2, 3, and/or 4 write display data or animation image data in an optical disc 18 or the like, the host computer 1 may read and display the original data preserved in an HDD 9 or similar devices on the screen of the display 16 as an image.

As a result, a user can visually confirm contents of the image data that is written in the optical disc 18.

In the above-described various embodiments, the recording software may be installed in the HDD 9 from the CD-ROM 12 and copied to RAM 8. In addition, the CPU 5 may then read the recording software, for example. However, any information storage medium may be employable as far as it can be accessed and provide the CPU 5 with a recording software. In addition, such a software can be utilized by the CPU 5 directly from the CD-ROM 12 or the like. Otherwise, the software can previously statically be stored in the ROM 7. In addition, the software can separately be stored in a plurality of information storage mediums.

Furthermore, the above-described various embodiments describes supposing that a CD-R/RW series is utilized as an exemplary optical disc drive that functions as an information recordation device constituting a computer system. However, those embodiments can be applied to a system in which a DVD-R/RW series is utilized as an exemplary optical disc drive in a similar manner.

Furthermore, each of the above-described various embodiments describes when applied to a system in which the optical disc drives 2, 3 and 4 as information recordation devices substantially have similar specifications and are externally connected to the host computer 1. However, it is not always required for the plurality of information recordation devices to have similar specifications and externally be connected to the host computer 1. Specifically, all of the plurality of information recordation apparatuses can be built in the host computer 1 together with the CD-ROM drive 13 and similar devices, for example.

The mechanisms and processes set forth in the present invention may be implemented using one or more conventional general purpose microprocessors and/or signal processors programmed according to the teachings in the present specification as will be appreciated by those skilled in the relevant arts. Appropriate software coding can readily be prepared by skilled programmers based on the teachings of the present disclosure, as will also be apparent to those skilled in the relevant arts. However, as will be readily apparent to those skilled in the art, the present invention also may be implemented by the preparation of application-specific integrated circuits by interconnecting an appropriate network of conventional component circuits or by a combination thereof with one or more conventional general purpose microprocessors and/or signal processors programmed accordingly. The present invention thus also includes a computer-based product which may be hosted on a storage medium and include, but is not limited to, any type of disk including floppy disks, optical disks, CD-ROMs, magnet-optical disks, ROMs, RAMs, EPROMs, EEPROMs, flash memory, magnetic or optical cards, or any type of media suitable for storing electronic instructions.

Numerous additional modifications and variations of the present invention are possible in light of the above teachings. It is therefore to be understood that within the scope of the appended claims, the present invention may be practiced otherwise than as specifically described herein.

What is claimed as new and desired to be protected by Letters Patent of the United States is:

1. An information recordation system, comprising:

a plurality of information recordation devices configured to record information onto information recordable mediums using at least one recording software;

a host computer configured to transmit write information from at least one storage device to the plurality of information recordation devices;

a write information candidate display device configured to selectively display at least one write information candidate stored in the at least one storage device on a display;

a write information selection device configured to select at least one write information among the at least one write information candidate;

an information recordation device candidate display device configured to display a plurality of information recordation device candidates on the display, said information recordation device candidates being available to cooperate with the host computer using the at least one recording software;

an information recordation device selection device configured to select at least two information recordation devices among the plurality of information recordation device candidates; and a recordation start instruction device configured to instruct the host computer to transmit one or more write information selected by the write information selection device to the at least two information recordation devices selected by the information recordation device selection devices, said recordation start instruction device instructing the at least two information recordation devices to work in parallel.

2. The information recordation system according to claim 1, wherein said plurality of information recordation devices include information recordable optical disc drives configured to record information onto optical discs, and wherein said information recordable optical disc drives are configured to include write devices configured to write information in the optical discs while maintaining data continuity between information write start and termination portions on the optical discs when recordation is stopped and restarted.

3. The information recordation system according to claim 1 or 2, further comprising a recording software selection device configured to select a plurality of desired recording software in accordance with a type of write information to be recorded, wherein said at least one write information and at least one information recordation device are selected in different combination per said recording software selection.

4. The information recordation system according to claim 1 or 2, further comprising a parallel operation instruction device configured to instruct the information recordation system to perform another job in parallel with the recordation performed by at least one information recordation device.

5. The information recordation system according to claim 4, wherein said job includes sound reproduction for reproducing write information originally stored in the at least one storage device via a speaker.

6. The information recordation system according to claim 4, wherein said job includes data display for displaying data contents originally stored in the at least one storage device on the display.

7. A computer readable medium storing program for use in an information recordation system including a plurality of information recordation devices configured to record write information onto information recordable mediums using at least one recording software, and a host computer configured to transmit write information from at least one storage device to the plurality of information recordation devices, said program performing finctions of:

displaying at least one write information candidate stored in the at least one storage device on a display;

selecting at least one write information to be recorded among the at least one write information candidate;

displaying a plurality of indications of information recordaton device candidates capable of cooperating with the host computer using the at least one recording software on the display;

selecting at least two information recordation devices through the display;

instructing the host computer to transmit selected write information from the at least one storage device to the at least two selected information recordation devices; and instructing the at least two information recordation devices to work in parallel.

8. The computer readable medium according to claim 7, wherein said program further performing functions of:

selecting a plurality of desired recording software in accordance with a type of write information to be recorded; and selecting the at least one write information and at least one information recordation device in different combination based on the selection of the plurality of desired recording software.

9. The computer readable medium according to claim 7, wherein said program further performing a function of instructing the information recordation system to perform another job in parallel with the recordation performed by at least one information recordation device.

10. The computer readable medium according to claim 9, wherein said another job includes reproducing of write information originally stored in the at least one storage device via a speaker.

11. The computer readable medium according to claim 9, wherein said another job includes displaying of data contents originally stored in the at least one storage device on the display.

* * * * *